United States Patent
Dudar

(10) Patent No.: US 12,234,757 B1
(45) Date of Patent: Feb. 25, 2025

(54) METHODS AND SYSTEMS FOR REGENERATING A PARTICULATE FILTER

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/508,616

(22) Filed: Nov. 14, 2023

(51) Int. Cl.
| | |
|---|---|
| *F01N 3/023* | (2006.01) |
| *B60H 1/22* | (2006.01) |
| *F01N 3/20* | (2006.01) |
| *F01N 9/00* | (2006.01) |

(52) U.S. Cl.
CPC ........... *F01N 3/023* (2013.01); *B60H 1/2206* (2013.01); *F01N 3/2006* (2013.01); *F01N 9/002* (2013.01); *F01N 2900/1602* (2013.01)

(58) Field of Classification Search
CPC ........ F01N 3/023; F01N 3/2006; F01N 9/002; F01N 2900/1602; B60H 1/2206
See application file for complete search history.

(56) References Cited

U.S. PATENT DOCUMENTS

| | | | |
|---|---|---|---|
| 6,318,077 B1 * | 11/2001 | Claypole | F01N 3/2006 |
| | | | 60/303 |
| 6,708,486 B2 | 3/2004 | Hirota et al. | |
| 7,958,721 B2 | 6/2011 | Craig et al. | |
| 8,051,644 B2 | 11/2011 | Gonze et al. | |
| 9,175,589 B2 | 11/2015 | Lee | |
| 9,957,865 B2 | 5/2018 | Ma | |
| 10,513,997 B2 | 12/2019 | Dudar | |
| 10,563,605 B2 | 2/2020 | Dudar | |
| 10,590,827 B2 | 3/2020 | Ulrey et al. | |
| 10,655,520 B2 | 5/2020 | Krüger et al. | |
| 2009/0126354 A1 * | 5/2009 | Gieshoff | F28F 27/02 |
| | | | 60/273 |
| 2011/0203261 A1 * | 8/2011 | Kotrba | F01N 3/2066 |
| | | | 60/299 |
| 2014/0311458 A1 * | 10/2014 | Tsumagari | F01N 3/18 |
| | | | 123/478 |
| 2016/0201532 A1 | 7/2016 | Chanko et al. | |
| 2017/0267064 A1 * | 9/2017 | Brandt | B60H 1/2206 |
| 2019/0055870 A1 * | 2/2019 | Krüger | F01N 13/0097 |
| 2019/0241040 A1 * | 8/2019 | Errick | B60H 1/2218 |
| 2022/0324432 A1 * | 10/2022 | Zhang | B60W 10/02 |

OTHER PUBLICATIONS

"Heavy-Duty Diesel Vehicle Idling Information," California Air Resources Board Website, Available Online at https://ww2.arb.ca.gov/capp-resource-center/heavy-duty-diesel-vehicle-idling-information, Available as Early as Jun. 29, 2021, 2 pages.
Foote, B., "Ford Plug-In Hybrids Still Allowed Under New 2035 Carb Ruling," Ford Authority Website, Available Online at https://fordauthority.com/2022/08/ford-plug-in-hybrids-still-allowed-under-new-2035-carb-ruling/, Aug. 26, 2022, 1 page.

\* cited by examiner

*Primary Examiner* — Brandon D Lee
(74) *Attorney, Agent, or Firm* — Vincent Mastrogiacomo; McCoy Russell LLP

(57) ABSTRACT

Systems and methods for heating a vehicle via a fuel operated heater are presented. In one example, the fuel operated heater heats a catalyst in an exhaust system of an internal combustion engine to reduce engine emissions. In another example, the fuel operated heater heats a particulate filter to purge soot from the particulate filter.

14 Claims, 5 Drawing Sheets

METHODS AND SYSTEMS FOR REGENERATING A PARTICULATE FILTER

TECHNICAL FIELD

The present description relates to a system and methods for regenerating a particulate filter and starting an engine.

BACKGROUND AND SUMMARY

Some direct injection gasoline fueled vehicles include particulate filters in their exhaust systems to capture carbonaceous soot that may be generated by the direct injection engines. The particulate filters are capacity constrained, so they may be purged of soot from time to time to lower exhaust back pressure. It may be advantageous to purge a particulate filter when an engine is operating at a lower load to reduce a possibility of vehicle drivability issues. However, many vehicles, including heavy duty vehicles, are turning to hybrid drive configurations to reduce vehicle emissions and increase vehicle fuel economy. Hybrid vehicles offer fewer opportunities for their engines to be operated at lower loads since their engines tend to operate less efficiently at lower loads and because the vehicle's electric propulsion sources are well suited for operating at low speeds and loads. For these reasons, hybrid vehicles may operate at low loads with their electric machines activated and their engines stopped (e.g., not rotating and not combusting fuel). Additionally, some jurisdictions may mandate that engines operate at idle for less than a threshold amount of time before the engine is stopped. As such, it may be difficult to find opportunities to purge a vehicle's particulate filter of carbonaceous soot.

The inventors herein have recognized the challenges of purging a particulate filter and have developed a method for purging a particulate filter, comprising: via a controller, activating a fuel operated heater that is configured to heat a passenger cabin of a vehicle in response to a request to purge a particulate filter of carbonaceous soot.

By activating a fuel operated heater, heat in exhaust of the fuel operated heater may be applied to purge a particulate filter of carbonaceous soot when an engine is stopped so that vehicle drivability may not be sacrificed when the engine is being operated. The particulate filter may be purged shortly after the engine is stopped so that the particulate filter may begin regenerating using less energy from the exhaust of the fuel operated heater.

The present description may provide several advantages. Specifically, the approach may purge a particulate filter without affecting vehicle drivability. Further, the approach may also include activating a catalyst via a fuel operated heater so that engine emissions may be reduced. Additionally, the approach may provide heat to a passenger cabin when an engine of a vehicle is stopped to increase passenger comfort.

The above advantages and other advantages, and features of the present description will be readily apparent from the following Detailed Description when taken alone or in connection with the accompanying drawings. The term "driver" may be referred to throughout this specification and it refers to a human driver or human vehicle operator that is the authorized operator of the vehicle unless otherwise indicated.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The advantages described herein will be more fully understood by reading an example of an embodiment, referred to herein as the Detailed Description, when taken alone or with reference to the drawings, where.

DETAILED DESCRIPTION

Figure 1:
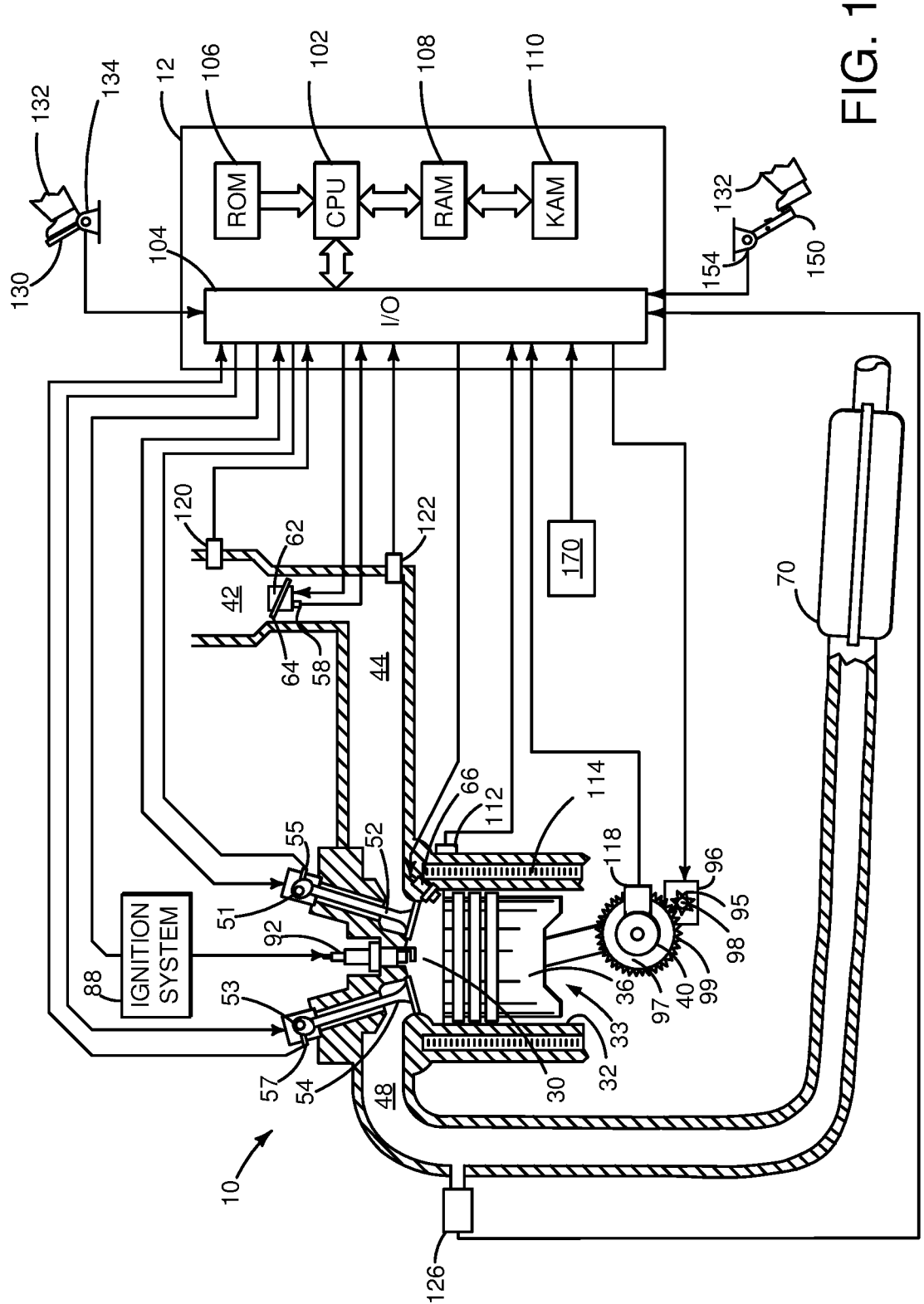
FIG. 1 is a schematic diagram of an internal combustion engine.
Figure 2:
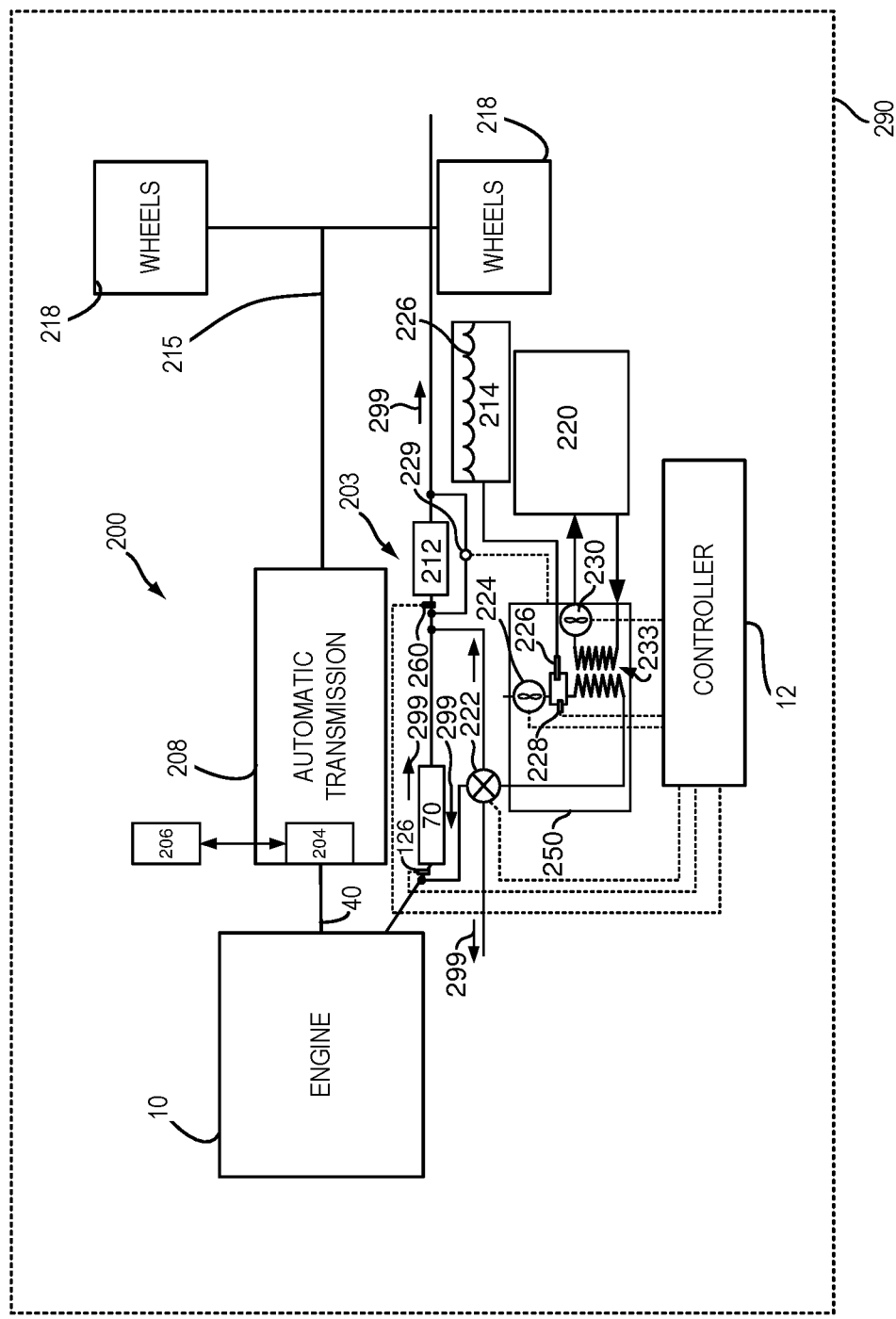
FIG. 2 shows an example vehicle driveline and exhaust system.
Figure 3:
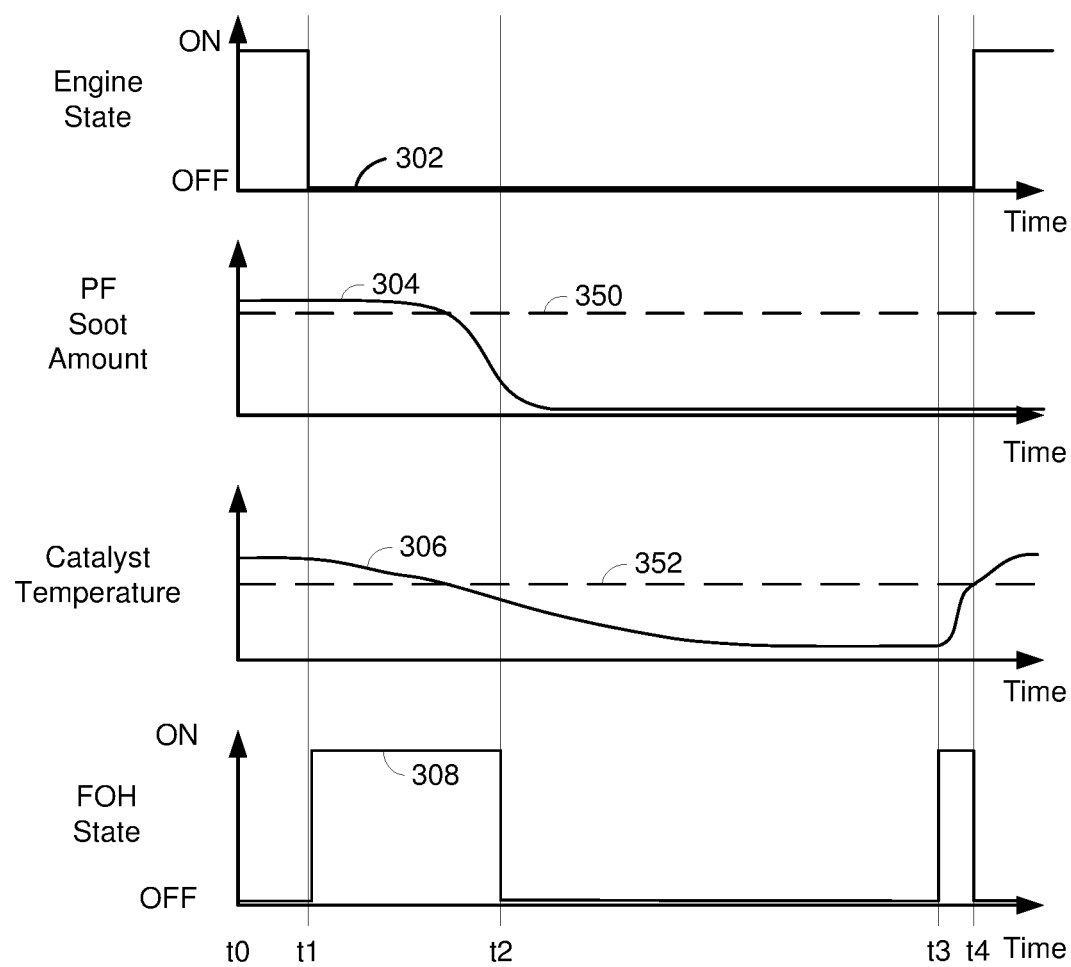
FIG. 3 shows an example heating sequence for a vehicle.
Figure 4:
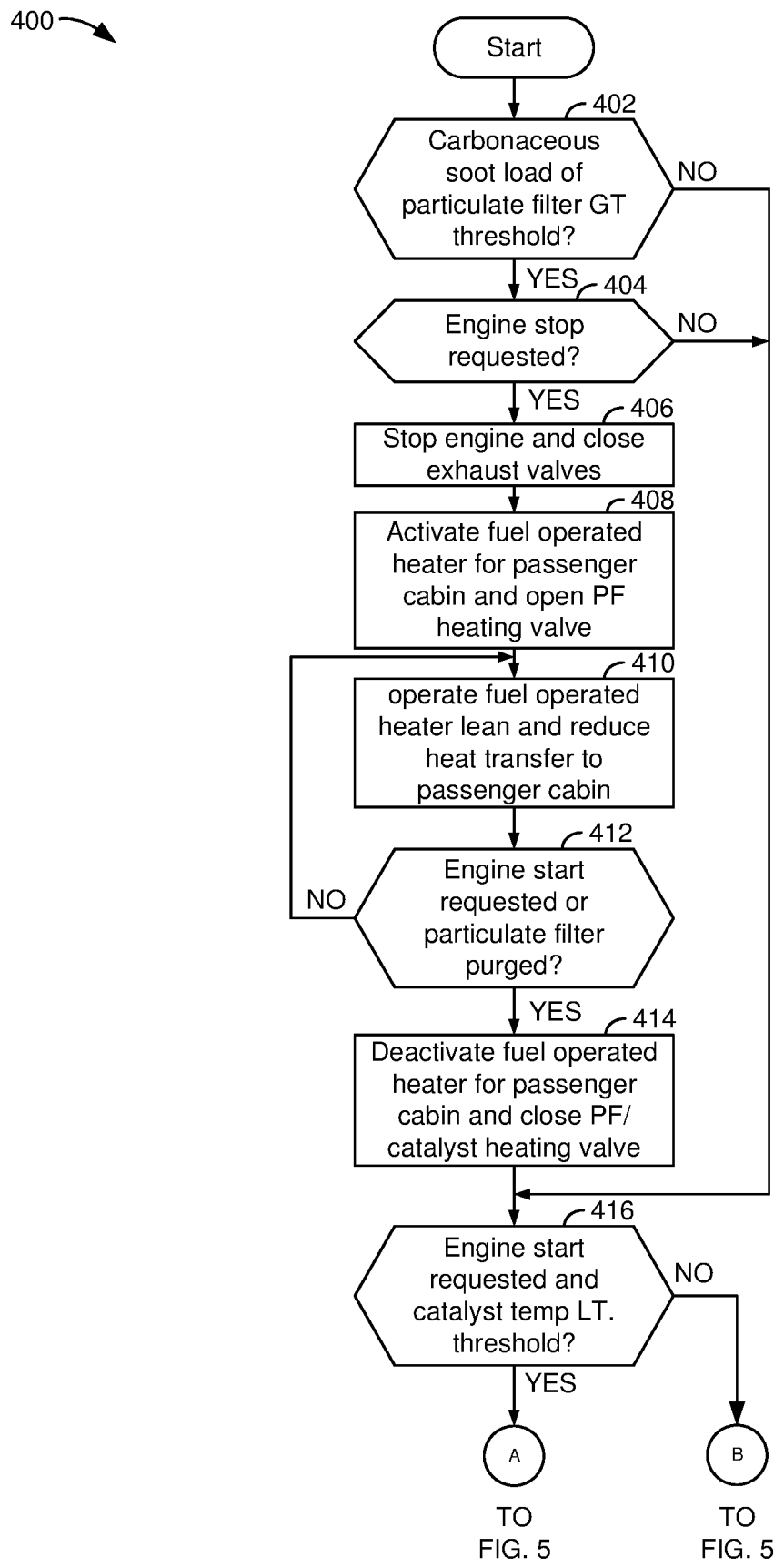
FIGS. 4 and 5 show a flowchart of a method for heating a vehicle.
Figure 5:
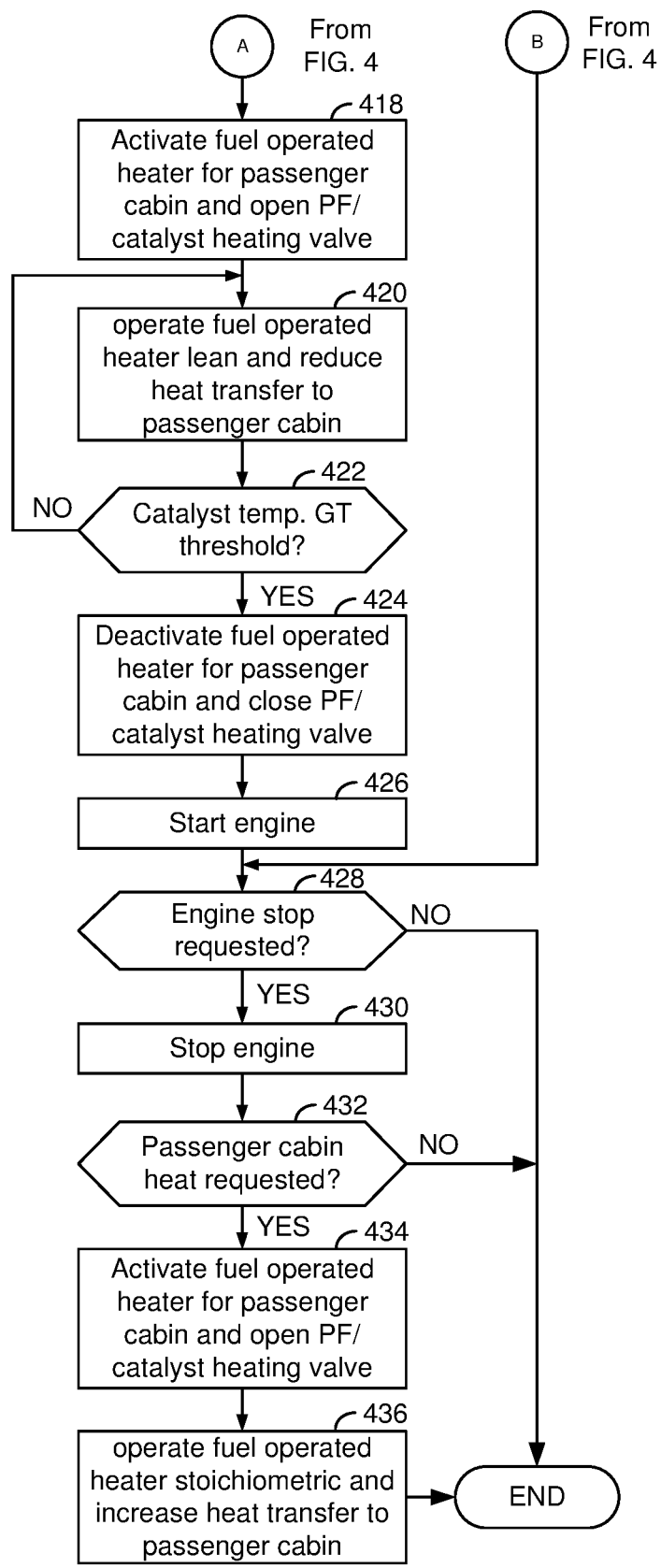

The present description is related to cold starting an engine and purging carbonaceous soot from a particulate filter. In particular, exhaust from a fuel operated heater may be applied to warm a catalyst for a cold engine start and to purge carbonaceous soot from a particulate filter. The particulate filter may trap carbonaceous soot that may be generated via a direct injection engine as shown in FIG. 1. The engine may include an exhaust system and it may be part of a vehicle as shown in FIG. 2. An example heating sequence for a vehicle is shown in FIG. 3. A flowchart of a method for heating a vehicle is shown in FIGS. 4 and 5.

Referring to FIG. 1, engine 10 is an internal combustion engine that comprises a plurality of cylinders, one cylinder 33 of which is shown in FIG. 1. Engine 10 is controlled by electronic engine controller 12. The controller receives signals from the various sensors of FIG. 1 and it employs the various actuators of FIG. 1 to adjust engine operation based on the received signals and instructions stored in memory of controller 12. For example, fuel injection timing, spark timing, and poppet valve operation may be adjusted responsive to engine position as determined from output of an engine position sensor.

Engine 10 includes combustion chamber 30, cylinder 33, and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 33, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example.

Controller 12 is shown in FIG. 1 as a conventional microcomputer including: microprocessor unit 102, input/output ports 104, read-exclusive memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing force applied by human driver 132; a measurement of engine manifold pressure (MAP) from pressure sensor 122 coupled to intake manifold 44; an engine position sensor from engine position sensor 118 sensing crankshaft 40 position; a measurement of air mass entering the engine from sensor 120; caliper pedal position from caliper pedal position sensor 154 when human driver 132 applies caliper pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses each revolution of the crankshaft from which engine speed (RPM) can be determined.

Controller 12 may receive input from human/machine interface 170. In one example, human/machine interface 170 may be a touch screen display. In other examples, human/machine interface 170 may be a key board, pushbutton, or other known interface. Controller 12 may also display information and data to human/machine interface 170.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, a block diagram of a vehicle 290 including a powertrain or driveline 200 is shown. The powertrain of FIG. 2 includes engine 10 shown in FIG. 1. It may be noted that this example shows a single controller. However, in other examples, the functions and operations performed via controller 12 may be distributed between a plurality of controllers.

Engine crankshaft 40 may be coupled to automatic transmission 208. Automatic transmission 208 may include an electric machine 204 to propel vehicle 290 when engine 10 is stopped (e.g., not rotating and not combusting fuel). Electric machine 204 may receive electric power from traction battery 206 when electric machine 204 is operating in a motor mode. Additionally, electric machine 204 may supply electric power to traction battery 206 when electric machine 204 is operating in a generator mode. Automatic transmission 208 may relay mechanical power to wheels 218 via driveshaft 215.

Engine 10 includes an exhaust system 203 that processes exhaust gases emitted from engine 10. Exhaust system 203 includes catalytic converter 70 and particulate filter 212. Exhaust gas of fuel operated heater (e.g., a heater that combusts fuel to generate heat) 250 may be directed to either or both of two locations in exhaust system 203. In particular, heat control valve 222 may direct exhaust gas from fuel operated heater 250 to a location in exhaust system 203 that is upstream of catalytic converter 70 when a temperature of catalytic converter 70 is less than a threshold. Heat control valve 222 may also direct exhaust gases from fuel operated heater 250 to a location that is downstream of catalytic converter 70 and upstream of particulate filter 212. Further, if desired, exhaust gases from fuel operated heater 250 may be directed by heat control valve 222 to atmosphere. Flow through exhaust system 203 and to exhaust system from heat control valve 222 is indicated by arrows 299.

Fuel operated heater 250 is fluidically coupled to exhaust system 203 via heat control valve 222. Fuel operated heater 250 is also in fluidic communication with passenger cabin 220 and fuel tank 214. Passenger cabin air fan 230 may draw air in from passenger cabin 220 and heat the passenger cabin air via heat exchanger 233 before returning the heated passenger cabin air to the passenger cabin 220. Combustion air may be drawn into fuel operated heater 250 via combustion air fan 224. The combustion air may be combined with fuel supplied by injector 226 and ignited by glow plug 228 to generate heat and exhaust gases. The heat may be transferred from the exhaust gases to passenger cabin air via heat exchanger 233. Exhaust gases may be directed to the exhaust system 203 or atmosphere via heat control valve 222. Fuel injector 226 may receive fuel 226 from fuel tank 214. Controller 12 may combust stoichiometric or lean air-fuel ratios in fuel operated heater 250 and fuel that is delivered to fuel operated heater 250 may be adjusted in response to oxygen sensors 126 and 260. Controller 12 may also control the amount of heat in exhaust gases from fuel operated heater 250 via adjusting a speed of passenger cabin air fan 230, which may modify the heat transfer rate through heat exchanger 233 and constrain heat flow to passenger cabin 220. Controller 12 may determine an amount of particulate matter that is stored in particulate filter 212 via output from differential pressure sensor 229.

Thus, the system of FIGS. 1 and 2 provides for a vehicle heating system, comprising: an internal combustion engine including an exhaust system, the exhaust system including a particulate filter; a fuel operated heater configured to supply heat to a passenger cabin of a vehicle and exhaust to the exhaust system; and one or more controllers including executable instructions stored in non-transitory memory that cause the one or more controllers to activate the fuel operated heater in response to the internal combustion engine being stopped and a request to purge the particulate filter of carbonaceous soot. In a first example, the vehicle heating system includes where activating the fuel operated heater includes activating a combustion air fan. In a second example that may include the first example, the vehicle heating system includes where activating the fuel operated heater includes supplying fuel to the fuel operated heater. In a third example that may include one or both of the first and second examples, the vehicle heating system further comprises additional executable instructions that cause the one or more controllers to activate the fuel operated heater in response to a catalyst temperature less than a threshold and an engine start request. In a fourth example that may include one or more of the first through third examples, the vehicle heating system further comprises additional executable instruction to supply exhaust gas from the fuel operated heater to a catalyst. In a fifth example that may include one or more of the first through fourth examples, the vehicle heating system further comprises additional executable instructions to start the internal combustion engine in response to a temperature of the catalyst exceeding a threshold temperature. In a sixth example that may include one or more of the first through fifth examples, the vehicle heating system further comprises additional executable instructions to supply heated air to the passenger cabin of the vehicle in response to a request for cabin heat and the internal combustion engine being stopped.

In another representation, the system of FIGS. 1 and 2 provides for a vehicle heating system, comprising: an internal combustion engine including an exhaust system, the exhaust system including a particulate filter; a fuel operated heater configured to supply heat to a passenger cabin of a vehicle and exhaust to the exhaust system; and one or more controllers including executable instructions stored in non-transitory memory that cause the one or more controllers to activate the fuel operated heater with a lean air-fuel mixture in response to the internal combustion engine being stopped and a request to purge the particulate filter of carbonaceous soot. In a first example, the method may further comprising adjusting an air-fuel ratio of the fuel operated heater in response to output of an exhaust sensor in an exhaust system of an engine.

Referring now to FIG. 3, an example heating sequence for a vehicle according to the method of FIGS. 4 and 5 is shown. The operating sequence of FIG. 3 may be generated via the system of FIGS. 1 and 2 in cooperation with the method of FIGS. 4 and 5. The plots of FIG. 3 are time aligned and the vertical lines indicate times of interest in the sequence.

The first plot from the top of FIG. 3 is a plot of engine operating state versus time. The vertical axis represents the engine operating state and the engine is running (e.g., rotating and combusting fuel) when trace 302 is at a higher level near the vertical axis arrow. The engine is not running (e.g., not rotating and not combusting fuel) when trace 302 is near the horizontal axis. The horizontal axis represents time and the amount of time increases from the left side of the plot to the right side of the plot. Trace 302 represents the engine operating state.

The second plot from the top of FIG. 3 is a plot of a particulate filter (PF) soot amount versus time. The vertical axis represents the particulate filter soot amount and the particulate filter soot amount increases in the direction of the vertical axis arrow. The horizontal axis represents time and the amount of time increases from the left side of the plot to the right side of the plot. Trace 304 represents the particulate filter soot amount. Horizontal line 350 represents a threshold particulate amount for purging a particulate filter of carbonaceous soot.

The third plot from the top of FIG. 3 is a plot of catalyst temperature versus time. The vertical axis represents catalyst temperature and catalyst temperature increases in the direction of the vertical axis arrow. The horizontal axis represents time and the amount of time increases from the left side of the plot to the right side of the plot. Trace 306 represents the catalyst temperature. Horizontal line 352 represents a threshold catalyst temperature (e.g., a catalyst light of temperature (a temperature above which catalyst efficiency exceeds 50%, for example)).

The fourth plot from the top of FIG. 3 is a plot of fuel operated heater operating state versus time. The vertical axis represents the fuel operated heater (FOH) operating state and the fuel operated heater is activated (e.g., combusting fuel and generating heat) when trace 308 is at a higher level that is near the vertical axis arrow. The horizontal axis represents time and the amount of time increases from the left side of the plot to the right side of the plot. Trace 308 represents the fuel operated heater state.

At time t0, the engine is running and the particulate filter is storing greater than a threshold amount of soot. The catalyst temperature is above light-off temperature and the fuel operated heater is off.

At time t1, the engine is stopped and shortly thereafter the fuel operated heater is activated to purge carbonaceous soot from the particulate filter. The exhaust gases from the fuel operated heater are directed to the inlet of the particulate filter and the fuel operated heater is operated to combust a lean air-fuel mixture. The lean gases operate to oxidize the soot that is stored within the particulate filter. The amount of soot stored in the particulate filter is unchanged and the catalyst temperature begins to fall.

At time t2, the amount of soot stored in the particulate filter has been reduced to less than the amount of threshold 350. The fuel operated heater is deactivated in response to the reduced soot amount and the catalyst temperature continues to decrease. The engine remains deactivated.

At time t3, a request to activate the engine is generated (not shown) and the fuel operated heater is activated in response to the request to activate the engine and catalyst temperature being less than threshold 352. Exhaust gases from the fuel operated heater are directed to the inlet of the catalyst to increase catalyst temperature. The amount of soot stored in the particulate filter is low and the engine is not started.

At time t4, catalyst temperature exceeds threshold 352, so the engine is started. The catalyst temperature continues to increase and the fuel operated heater is deactivated. The amount of soot that is stored in the particulate filter is unchanged.

In this way, heat that is generated by operating a fuel operated heater may be applied to purge a particulate filter and warm a catalytic converter. Further, if the engine is stopped and heat is requested for a vehicle's passenger cabin, the fuel operated heater may deliver heat to the passenger cabin.

Referring now to FIGS. 4 and 5, a flow chart of a method for heating a vehicle is shown. The method of FIGS. 4 and 5 may be incorporated into and may cooperate with the system of FIGS. 1 and 2. Further, at least portions of the method of FIGS. 4 and 5 may be incorporated as executable instructions stored in non-transitory memory while other portions of the method may be performed via a controller transforming operating states of devices and actuators in the physical world.

At 402, method 400 judges whether or not an amount of carbonaceous soot that is stored in a particulate filter in an exhaust system is greater than a threshold amount. Method 400 may determine the amount of carbonaceous soot stored in the particulate filter via a differential pressure sensor. If method 400 judges that the amount of carbonaceous soot stored in the particulate filter is greater than a threshold amount, the answer is yes and method 400 proceeds to 404. Otherwise, the answer is no and method 400 proceeds to 416.

At 404, method 400 judges whether or not an engine stop is requested. An engine stop request may be generated via a user, automatic driver, or controller. If method 400 judges that an automatic engine stop is requested, the answer is yes and method 400 proceeds to 406. Otherwise, the answer is no and method 400 proceeds to 416.

At 406, method 400 stops the engine and fully closes all engine exhaust valves to prevent flow into the engine. Method 400 may stop the engine by ceasing to provide fuel and spark to the engine. Method 400 proceeds to 408.

At 408, method 400 activates a fuel operated heater that is configured to supply heated air to a passenger cabin of a vehicle. The fuel operated heater may be activated by supplying electric power to a glow plug, supplying fuel to the fuel operated heater, and activating a combustion air fan that supplies air to the fuel operated heater. Additionally, method 400 adjusts a position of a heating control valve so that exhaust from the fuel operated heater is directed to a location upstream of the particulate filter and downstream of a catalyst to heat the soot that is held within the particulate filter. Method 400 proceeds to 410.

At 410, method 400 operates the fuel operated heater so as to combust a lean air-fuel mixture in the fuel operated heater. Method 400 may also operate the fuel operated heater to minimize heat transfer to the vehicle's passenger cabin. The heat transfer to the passenger cabin may be minimized by operating a cabin air fan at zero speed. By minimizing the heat that is transferred to the passenger cabin, the amount of heat in exhaust gases of the fuel operated heater may be increased, thereby increasing a temperature of soot that is stored in the particulate filter. Method 400 proceeds to 412.

At 412, method 400 judges whether an engine start is present or if an amount of soot that is stored in the particulate filter is less than a threshold amount. If so, the answer is yes and method 400 proceeds to 414. Otherwise, the answer is no and method 400 returns to 410.

At 414, method 400 deactivates the fuel operated heater and closes the heating valve. The fuel operated heater may be deactivated by ceasing to supply fuel and electric power to the fuel operated heater. Method 400 may also deactivate the combustion air fan. Method 400 proceeds to 416.

At 416, method 400 judges whether or not an engine start is requested and a catalyst temperature is less than a threshold temperature. The engine start request may be input to a human/machine interface or it may be generated via a controller. If method 400 judges that an engine start was requested and catalyst temperature is less than a threshold, the answer is yes and method 400 proceeds to 418. Otherwise, the answer is no and method 400 proceeds to 428.

At 418, method 400 activates a fuel operated heater that is configured to supply heated air to a passenger cabin of a vehicle. The fuel operated heater may be activated by supplying electric power to a glow plug, supplying fuel to the fuel operated heater, and activating a combustion air fan that supplies air to the fuel operated heater. Additionally, method 400 adjusts a position of a heating control valve so that exhaust from the fuel operated heater is directed to a location upstream of the catalyst to heat the catalyst to a temperature above its light-off temperature. Method 400 proceeds to 420.

At 420, method 400 operates the fuel operated heater so as to combust a lean air-fuel mixture in the fuel operated heater. Method 400 may also operate the fuel operated heater to minimize heat transfer to the vehicle's passenger cabin. The heat transfer to the passenger cabin may be minimized by operating a cabin air fan at zero speed. By minimizing the heat that is transferred to the passenger cabin, the amount of heat in exhaust gases of the fuel operated heater may be increased, thereby increasing a temperature of catalyst. Method 400 proceeds to 422. At 422, method 400 judges whether a catalyst temperature is greater than a threshold temperature (e.g., a catalyst light-off temperature). If so, the answer is yes and method 400 proceeds to 424. Otherwise, the answer is no and method 400 returns to 420.

At 424, method 400 deactivates the fuel operated heater and closes the heating valve. The fuel operated heater may be deactivated by ceasing to supply fuel and electric power to the fuel operated heater. Method 400 may also deactivate the combustion air fan. Method 400 proceeds to 426.

At 426, method 400 starts the engine and combusts a lean air-fuel ratio in the engine. Method 400 proceeds to 428.

At 428, judges whether or not an engine stop has been requested or if the engine is already stopped. If so, the answer is yes and method 400 proceeds to 430. Otherwise, the answer is no and method 400 proceeds to exit.

At 430, method stops the engine by ceasing to supply fuel to the engine. Method 400 may also cease delivering spark to the engine. Method 400 proceeds to 432.

At 432, method 400 judges whether or not passenger cabin heating is requested. Passenger cabin heating may be requested via a user of via a climate control system. If method 400 judges that passenger cabin heating is requested, the answer is yes and method 400 proceeds to 434.

At 434, method 400 activates a fuel operated heater that is configured to supply heated air to a passenger cabin of a vehicle. The fuel operated heater may be activated by supplying electric power to a glow plug, supplying fuel to the fuel operated heater, and activating a combustion air fan that supplies air to the fuel operated heater. Additionally, method 400 adjusts a position of a heating control valve so that exhaust from the fuel operated heater is directed to a location upstream of the catalyst, or alternatively, to atmosphere. Directing the exhaust gases to the catalyst may have the added benefit of reducing hydrocarbons that may be mixed with fuel operated heater exhaust gases. Method 400 proceeds to 436.

At 436, method 400 operates the fuel operated heater so as to combust a stoichiometric air-fuel mixture in the fuel operated heater. Method 400 may also operate the fuel operated heater to increase heat transfer to the vehicle's passenger cabin. The heat transfer to the passenger cabin may be increased by operating a cabin air fan above zero speed. The fuel operated heater may be deactivated when the passenger cabin reaches a target temperature. Method 400 proceeds to exit.

In this way, method 400 may apply a fuel operated heater to heat a catalyst, heat a particulate filter, and heat a passenger cabin. The catalyst and the particulate filter may be heated via exhaust gases from the fuel operated heater and the passenger cabin may be heated by heat that is transferred from exhaust gases generated by the fuel operated heater to passenger cabin air. The heat may be transferred via a heat exchanger.

Thus, method 400 provides for a method for purging a particulate filter, comprising: via a controller, activating a fuel operated heater that is configured to heat a passenger cabin of a vehicle in response to a request to purge a particulate filter of carbonaceous soot. In a first example, the method includes where activating the fuel operated heater includes supplying fuel from a fuel tank to the fuel operated heater. In a second example that may include the first example, the method includes where activating the fuel operated heater includes activating a glow plug. In a third example that may include one or both of the first and second examples, the method further comprises operating the fuel operated heater lean. In a fourth example that may include one or more of the first and second examples, the method further comprises constraining heat delivery to a passenger cabin from the fuel operated heater. In a fifth example that may include one or more of the first through fourth examples, the method includes where constraining heat delivery to the passenger cabin includes operating a fan at a speed less than a threshold speed. In a fifth example that may include one or more of the first through fourth examples, the method further comprises adjusting a position of a heat control valve in response to the request to purge the particulate filter of carbonaceous soot. In a sixth example that may include one or more of the first through fifth examples, the method includes where the position of the heat control valve is adjusted to direct exhaust gas from the fuel operated heater to the particulate filter.

Method 400 also provides for a

A method for starting an internal combustion engine, comprising: via a controller, activating a fuel operated heater that is configured to heat a passenger cabin of a vehicle in response to a request to heat the passenger cabin and the internal combustion engine being stopped. In a first example, the method includes where activating the fuel operated heater includes activating a combustion air fan and a passenger cabin air fan. In a second example that may include the first example, the method includes where activating the fuel operated heater includes supplying fuel to the fuel operated heater. In a third example that may include one or both of the first and second examples, the method further comprises combusting a stoichiometric air-fuel ratio via the fuel operated heater. In a fourth example that may include one or more of the first through third examples, the method further comprises directing exhaust gas from the fuel operated heater to a catalyst in an exhaust system of the internal combustion engine.

As will be appreciated by one of ordinary skill in the art, methods described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for purging a particulate filter, comprising:
via a controller, during a first stopped engine condition, operating a fuel operated heater that is configured to heat a passenger cabin of a vehicle in response to a request to purge the particulate filter of carbonaceous soot and directing exhaust from the fuel operated heater to the particulate filter, the fuel operated heater operating with a lean air-fuel ratio, and, during a second stopped engine condition, operating the fuel operated heater with a stoichiometric air-fuel ratio and directing exhaust from the fuel operated heater to a three-way type catalyst.

2. The method of claim 1, where activating the fuel operated heater includes supplying fuel from a fuel tank to the fuel operated heater.

3. The method of claim 2, where activating the fuel operated heater includes activating a glow plug.

4. The method of claim 1, further comprising constraining heat delivery to the passenger cabin from the fuel operated heater.

5. The method of claim 4, where constraining heat delivery to the passenger cabin includes operating a fan at a speed less than a threshold speed.

6. The method of claim 1, further comprising adjusting a position of a heat control valve in response to the request to purge the particulate filter of carbonaceous soot.

7. The method of claim 6, where the position of the heat control valve is adjusted to direct exhaust gas from the fuel operated heater to the particulate filter.

8. A vehicle heating system, comprising:
an internal combustion engine including an exhaust system, the exhaust system including a particulate filter and a three-way catalyst, the exhaust system further including a first oxygen sensor positioned upstream of the three-way catalyst and a second oxygen sensor positioned downstream of the three-way catalyst and upstream of the particulate filter;

a fuel operated heater configured to supply heat to a passenger cabin of a vehicle and exhaust to the exhaust system; and one or more controllers including executable instructions stored in non-transitory memory that cause the one or more controllers to activate the fuel operated heater in response to the internal combustion engine being stopped and a request to purge the particulate filter of carbonaceous soot, and that cause the one or more controllers to combust stoichiometric and lean air-fuel ratios in the fuel operated heater depending on operating conditions, where activating the fuel operated heater includes supplying fuel to the fuel operated heater, the supplied fuel adjusted in response to the first oxygen sensor and the second oxygen sensor.

9. The vehicle heating system of claim 8, where activating the fuel operated heater includes activating a combustion air fan.

10. The vehicle heating system of claim 8, further comprising additional executable instructions that cause the one or more controllers to activate the fuel operated heater in response to a catalyst temperature less than a threshold and an engine start request.

11. The vehicle heating system of claim 10, further comprising additional executable instructions to supply exhaust gas from the fuel operated heater to a catalyst.

12. The vehicle heating system of claim 11, further comprising additional executable instructions to start the internal combustion engine in response to a temperature of the catalyst exceeding a threshold temperature.

13. The vehicle heating system of claim 8, further comprising additional executable instructions to supply heated air to the passenger cabin of the vehicle in response to a passenger cabin heating request and the internal combustion engine being stopped.

14. The vehicle heating system of claim 8, further comprising additional executable instructions to operate the fuel operated heater with a lean air-fuel ratio in response to the internal combustion engine being stopped and the request to purge the particulate filter of carbonaceous soot, and, during a second stopped engine condition, operate the fuel operated heater with a stoichiometric air-fuel ratio and direct exhaust from the fuel operated heater to the three-way type catalyst.

* * * * *